(12) United States Patent
Basulto et al.

(10) Patent No.: US 10,082,727 B2
(45) Date of Patent: *Sep. 25, 2018

(54) RECEPTACLE FOR A COMPUTING DEVICE THAT PERFORMS IMAGE CAPTURE

(71) Applicant: iOgrapher, LLC, San Gabriel, CA (US)

(72) Inventors: David Basulto, San Gabriel, CA (US); Jason Ivey, Irvine, CA (US)

(73) Assignee: iOgrapher, LLC, San Gabriel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/473,388

(22) Filed: Mar. 29, 2017

(65) Prior Publication Data

US 2017/0205689 A1   Jul. 20, 2017

Related U.S. Application Data

(63) Continuation of application No. 14/964,255, filed on Dec. 9, 2015, now Pat. No. 9,772,543, which is a continuation of application No. 13/895,349, filed on May 15, 2013, now Pat. No. 9,386,194.

(60) Provisional application No. 61/768,751, filed on Feb. 25, 2013.

(51) Int. Cl.
| | |
|---|---|
| *G03B 17/00* | (2006.01) |
| *G03B 17/56* | (2006.01) |
| *H04W 88/02* | (2009.01) |

(52) U.S. Cl.
CPC ......... *G03B 17/563* (2013.01); *G03B 17/561* (2013.01); *H04W 88/02* (2013.01)

(58) Field of Classification Search
USPC .......................................................... 396/420
See application file for complete search history.

(56) References Cited

U.S. PATENT DOCUMENTS

| | | | | |
|---|---|---|---|---|
| 3,984,855 A | * | 10/1976 | Baczynsky | ............ F16M 13/04 |
| | | | | 224/908 |
| 4,091,402 A | * | 5/1978 | Siegel | .................. G03B 15/041 |
| | | | | 362/3 |
| 4,272,177 A | * | 6/1981 | Ottenheimer | .......... F16M 11/08 |
| | | | | 396/423 |
| D613,285 S | * | 4/2010 | Grant | .......................... D14/341 |
| 7,916,478 B2 | * | 3/2011 | Tu | .......................... F16M 11/10 |
| | | | | 248/398 |

(Continued)

*Primary Examiner* — Rodney Fuller
(74) *Attorney, Agent, or Firm* — Patent Ingenuity, P.C.; Samuel K. Simpson

(57) ABSTRACT

An apparatus has a receptacle configured to receive an image capture computing device. Further, the apparatus has a first handle having a first handle top portion that is operably connected to the receptacle and a first handle bottom portion that is operably connected to the receptacle. In addition, the apparatus has a first retraction device that retracts the first handle inwardly toward the receptacle and extends the first handle outwardly away from the receptacle. The apparatus has a second handle having a second handle top portion that is operably connected to the receptacle and a second handle bottom portion that is operably connected to the receptacle. Further, the apparatus has a second retraction device that retracts the second handle inwardly toward the receptacle and extends the second handle outwardly away from the receptacle.

20 Claims, 18 Drawing Sheets

(56) References Cited

U.S. PATENT DOCUMENTS

| | | | | |
|---|---|---|---|---|
| D691,144 S | * | 10/2013 | Peters | D14/440 |
| D727,917 S | * | 4/2015 | Yeo | D14/440 |
| 9,288,920 B1 | * | 3/2016 | Steiner | F16M 11/38 |
| 9,473,190 B1 | * | 10/2016 | Sandlofer | G03B 17/563 |
| D784,350 S | * | 4/2017 | Li | D14/440 |
| 9,772,064 B2 | * | 9/2017 | Chen | F16M 13/02 |
| 2007/0149325 A1 | * | 6/2007 | Vargas | A63B 57/207 |
| | | | | 473/408 |
| 2007/0248351 A1 | * | 10/2007 | Desorbo | G03B 17/563 |
| | | | | 396/420 |
| 2007/0292125 A1 | * | 12/2007 | Saxton | G03B 17/561 |
| | | | | 396/420 |
| 2009/0063745 A1 | * | 3/2009 | Morris | F16M 13/00 |
| | | | | 710/304 |
| 2010/0132203 A1 | * | 6/2010 | Green | B23D 49/12 |
| | | | | 30/513 |
| 2012/0044624 A1 | * | 2/2012 | Hoffman | G06F 1/1628 |
| | | | | 361/679.21 |
| 2013/0113229 A1 | * | 5/2013 | Wu | H04M 1/04 |
| | | | | 294/138 |
| 2015/0201113 A1 | * | 7/2015 | Wood | G03B 17/561 |
| | | | | 348/376 |
| 2015/0362122 A1 | * | 12/2015 | Brown | F16M 11/041 |
| | | | | 348/208.2 |
| 2016/0295716 A1 | * | 10/2016 | Chen | F16M 13/005 |

* cited by examiner

RECEPTACLE FOR A COMPUTING DEVICE THAT PERFORMS IMAGE CAPTURE

RELATED APPLICATIONS

This patent application is a Continuation application of U.S. patent application Ser. No. 14/964,255, filed on Dec. 9, 2015, entitled RECEPTACLE FOR A COMPUTING DEVICE THAT PERFORMS IMAGE CAPTURE, which a Continuation-In-Part application of U.S. patent application Ser. No. 13/895,349, filed on May 15, 2013, entitled RECEPTACLE FOR AN IMAGE CAPTURE COMPUTING DEVICE, which claims priority to U.S. Provisional Patent Application Ser. No. 61/768,751, filed on Feb. 25, 2013, entitled A PLASTIC CASE FOR THE IPAD MINI AND IPAD. IT HAS HANDLES ON THE SIDES, 3 ACCESSORY SHOE AREAS, A TRIPOD MOUNT, AND THE ABILITY TO SCREW ON 37 MM LENSES., which are hereby incorporated by reference in their entireties.

BACKGROUND

1. Field

This disclosure generally relates to the field of image capture. More particularly, the disclosure relates to a stabilization configuration for a receptacle for a mobile computing device that performs image capture.

2. General Background

Standard cameras typically allow for utilization of a tripod. For example, a photographer can place a standard camera on a tripod so that movement of the camera during image capture is minimized. The tripod allows a photographer using a standard camera to take pictures without using both hands to stabilize the camera.

Current mobile computing devices, e.g., tablet devices, smartphones, etc., provide image capture capabilities, e.g., still or motion, that are comparable with standard image capture devices such as standard cameras. Yet the picture quality from such mobile computing devices is often of a lesser quality than that of standard cameras as standard cameras provide users with firmer stabilization abilities than a mobile computing device. Users often have difficulty keeping the mobile computing device stable during image capture. The mobile computing device often wobbles during the image capture, which then results in pictures or videos that are often of a less than ideal quality.

Further, many applications utilized by mobile computing devices necessitate a particular orientation for image capture. For instance, many social networking applications configured for utilization by mobile computing devices will only display pictures in a particular format, e.g., a user has to scroll vertically rather than horizontally through pictures. A user has to take pictures in a manner consistent with that format to avoid having to crop the pictures. For example, the user would have to crop pictures taken with a mobile computing device horizontally for an application that displays those pictures vertically. The necessity of cropping and/or other image modification techniques may diminish the quality of the captured image.

Although the vertical format is necessary for image capture for many applications, the vertical format provides less stabilization for a user than the horizontal format. A user may have more difficulty stabilizing a mobile computing device vertically rather than horizontally as the vertical configuration has a lesser width for positioning of the hands of the user than the horizontal configuration. As a result, current mobile computing devices provide limited capabilities to photographers.

In addition, a user of current mounting configurations is typically unable to optimally utilize the mobile computing device for many, if not all, of the features provided by the mobile computing device when the mobile computing device is mounted, e.g., to a tripod. In other words, the mobile computing device is attached to a mounting configuration that prevents optimal user input, e.g., typing, swiping, etc., to navigate various applications provided by the mobile computing device. As a result, many users have to remove the mobile computing device from the mounting configuration to perform typical navigation of the applications provided by the mobile computing device. The user then has to remount the mobile computing device to the mounting configuration to perform image capture. Such a process of mounting, dismounting, and remounting the mobile computing device to and from the mounting configuration is a cumbersome process.

Further, such a process may lead to various inefficiencies. For example, a camera person may be performing image capture of scenes for a movie with the mobile computing device that is mounted to a tripod while also receiving communications from the director about the scenes. The camera person inefficiently may have to perform the process of dismounting the mobile computing device to answer such communications and then remount the mobile computing device to continue image capture. In other words, the image capture of the movie scenes may involve numerous interruptions that results from the mounting, dismounting, and remounting process. Such interruptions may diminish the quality of the media production.

Therefore, current mounting configurations for mobile computing devices are not adequate for performing both image capture and other mobile device functionality. A user has to either keep the mobile device mounted to the mounting configuration, which limits the usability of the mobile device for other functionality, or has to remove the mobile device from the mounted configuration, which removes the stabilization provided by the mounting configuration for accurate image capture.

SUMMARY

In one aspect of the disclosure, an apparatus is provided. The apparatus has a receptacle configured to receive an image capture computing device. Further, the apparatus has a first handle having a first handle top portion that is operably connected to the receptacle and a first handle bottom portion that is operably connected to the receptacle. In addition, the apparatus has a first retraction device that retracts the first handle inwardly toward the receptacle and extends the first handle outwardly away from the receptacle. The apparatus has a second handle having a second handle top portion that is operably connected to the receptacle and a second handle bottom portion that is operably connected to the receptacle. Further, the apparatus has a second retraction device that retracts the second handle inwardly toward the receptacle and extends the second handle outwardly away from the receptacle.

In another aspect of the disclosure, an apparatus is provided. The apparatus has a receptacle configured to receive an image capture computing device. Further, the apparatus has a first handle having a first handle top portion that is operably connected to the receptacle and a first handle bottom portion that is operably connected to the receptacle.

In addition, the apparatus has a first compression device that compresses the first handle inwardly toward the receptacle and extends the first handle outwardly away from the receptacle. The apparatus also has a second handle having a second handle top portion that is operably connected to the receptacle and a second handle bottom portion that is operably connected to the receptacle. Further, the apparatus has a second compression device that compresses the second handle inwardly toward the receptacle and extends the second handle outwardly away from the receptacle.

In yet another aspect of the disclosure, an apparatus is provided. The apparatus has a receptacle configured to receive an image capture computing device. Further, the apparatus has a first handle having a first handle top portion that is operably connected to the receptacle and a first handle bottom portion that is operably connected to the receptacle. The first handle is detachable from the receptacle. In addition, the apparatus has a second handle having a second handle top portion that is operably connected to the receptacle and a second handle bottom portion that is operably connected to the receptacle. The second handle is detachable from the receptacle.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
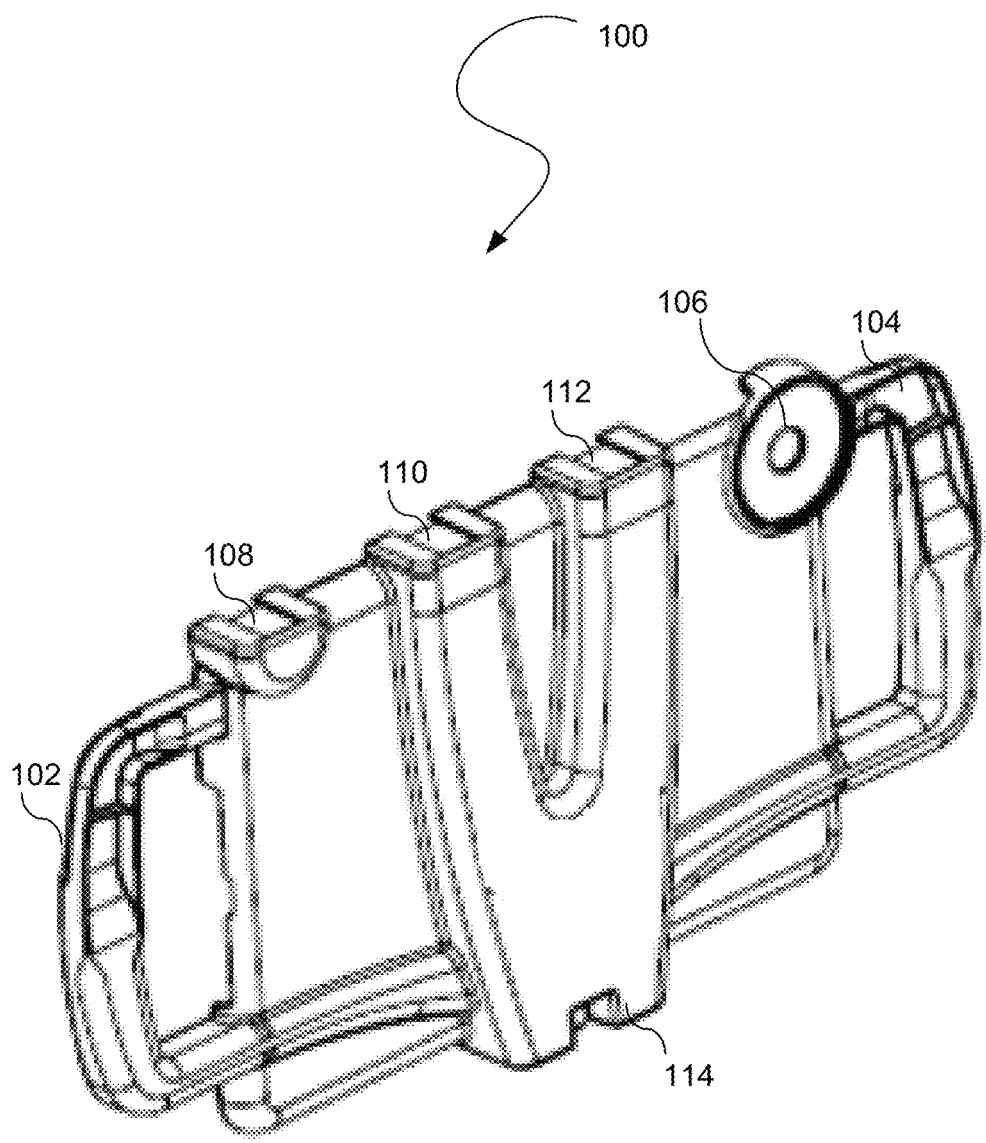
FIG. 1 illustrates a front view of an image capture computing device receptacle.

A receptacle for a computing device that performs image capture is provided. The image capture computing device is received by the receptacle. A user then grasps the receptacle and motions the receptacle to a position for image capture. The receptacle has handles that provide for stabilization of the receptacle and the image capture computing device. As a result, users performing image capture have the ability to capture still images and/or video images with stabilization. In contrast with heavy receptacles that do not have handles, the receptacle for the image capture computing device provides a lightweight configuration that provides stabilization for an image capture computing device.

Further, the receptacle may have additional components that allow the user performing image capture to vary image capture conditions. For example, the receptacle may receive a variety of lenses that may be utilized to vary viewing conditions. Further, various lighting and/or audio equipment may be positioned on the receptacle to vary lighting and/or audio conditions. The receptacle may also have a tripod component so that the receptacle may be stabilized with a tripod to minimize motion of the image capture computing device during image capture.

In addition, the handles for the receptacle may be adjusted to allow the user to perform other functionality provided by the image capture computing device without the user having to remove the image capture computing device from the receptacle. For instance, a sliding configuration allows the user to slide the handles into the receptacle. As a result, the user may grasp the handles with the receptacle attached to the image capture computing device to perform various functionalities, e.g., navigation of applications provided by the image capture computing device, without interference from the handles. As a result, the user is able to quickly and efficiently transition from an image capture mode, e.g., extended handles, to an application accessibility mode, e.g., retracted handles.

Further, a handle compression configuration allows the user to compress, e.g., fold, the handles. As a result, the user is also able to quickly and efficiently transition from an image capture mode, e.g., extended handles, to an application accessibility mode, e.g., retracted handles.

Therefore, a configuration is provided that allows a user to utilize the image capture receptacle with the handles to perform stable image capture, but to conceal the handles when not performing image capture. In other words, the user does not have to remove the mobile computing device from the image capture receptacle if image capture is not performed. The user may conceal the handles so that the user may utilize the mobile computing device while the mobile computing device is situated within the image capture receptacle to perform other functions when not performing image capture. Further, the configuration allows the user to perform such tasks without the handles obstructing the maneuverability of the user. In other words, the user may want to perform various tasks on the mobile computing device other than image and/or video capture for which the handles may not be optimal.

FIG. 1 illustrates a front view of an image capture computing device receptacle 100. In one embodiment, the image capture computing device receptacle 100 includes a plurality of handles, e.g., a right handle 102 and a left handle 104. The front of the image capture computing device receptacle 100 is illustrated from the perspective of what another user views if in front of the image capture computing device 100 when an image is captured by a user such as a photographer. The right handle 102 and the left handle 104 allow the user to perform image capture with minimal wobbling. As a result, the photographer is able to perform image capture with more stabilization and accuracy than without the image capture computing device receptacle 100. Although the right handle 102 and the left handle 104 are illustrated, the handles may be in other locations, e.g., a top handle and a bottom handle. Further, a single handle or more than two handles may be utilized. The right handle 102 and the left handle 104 are provided merely for illustrative purposes.

The image capture computing device receptacle 100 also has an aperture 106. The aperture 106 is configured so that an image capture component, e.g., a lens of a mobile image capture computing device, may be positioned to capture images through the aperture 106. In one embodiment, the aperture 106 is configured to be in substantial proximity to the image capture component. For example, the aperture may be narrow enough to only be positioned over the lens to minimize reflection.

In another embodiment, the image capture computing device receptacle 100 has a plurality of accessory receiving means. As an example, the image capture computing device receptacle 100 has a receiving means 108, a receiving means 110, a receiving means 112, and a receiving means 114. The various receiving means may be utilized to receive accessories such as lighting devices, e.g., lamps, audio devices, e.g., microphones, additional lenses, e.g., wide angle lenses, tripods, and/or the like. For example, the receiving means 114 may receive a tripod mount to provide further stabilization for the image capture computing device receptacle 100 with a tripod. A single or different quantity of receiving means may be utilized from that illustrated in FIG. 1.

In one embodiment, the right handle 102 and the left handle 104 are integrated within the same frame as the image capture computing device receptacle 100. In other words, a single molding may be utilized for the frame and the handles. In an alternative embodiment, the right handle 102 and the left handle are detachable from the frame.

Figure 2:
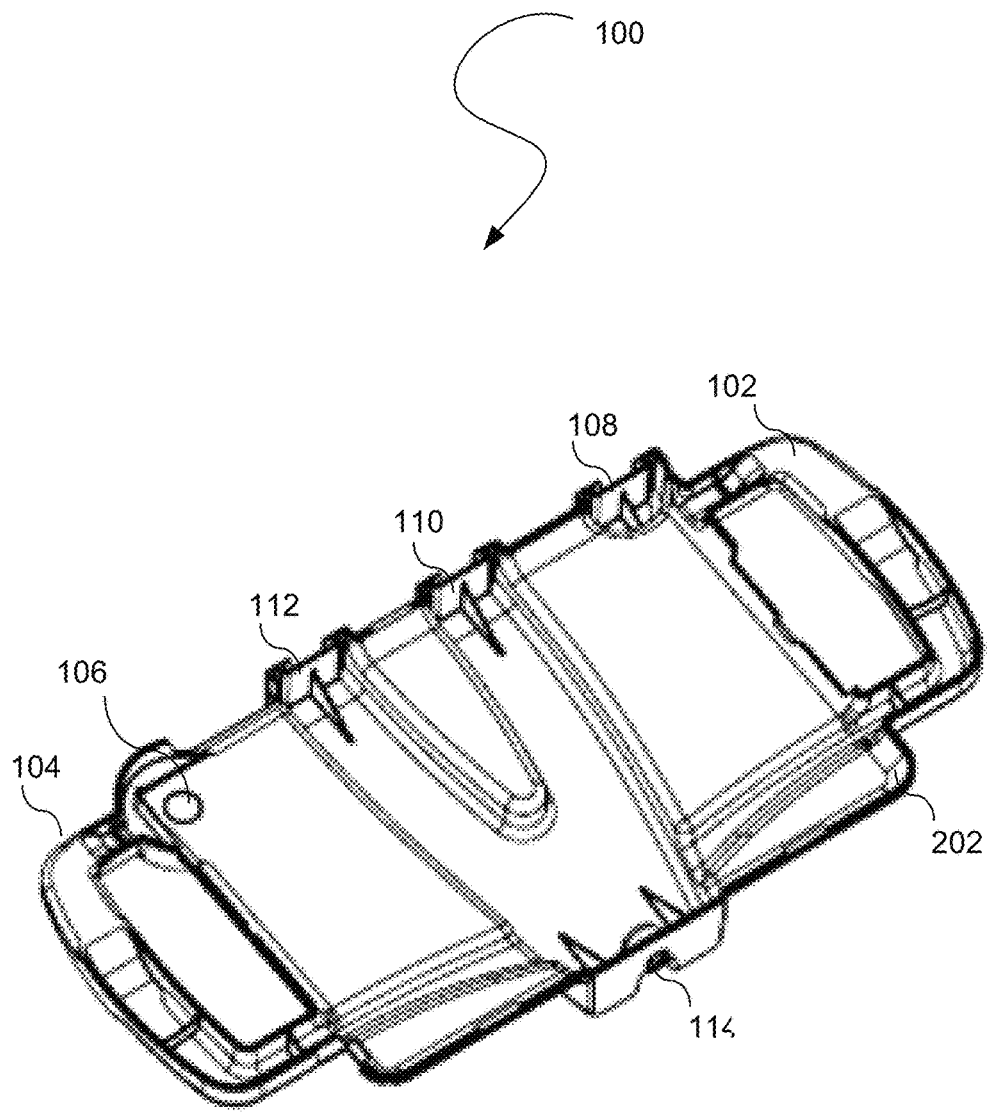
FIG. 2 illustrates a back view of the image capture computing device receptacle.

FIG. 2 illustrates a back view of the image capture computing device receptacle 100. The back view is from the perspective of the photographer that is placing the mobile computing device in the image capture computing device receptacle 100. In one embodiment, the image capture computing device receptacle 100 has a receiving means for receiving the image capture computing device receptacle 100. An example of the receiving means is the lip 202. The lip 202 may be positioned throughout all of the frame or at least a portion of the frame. A photographer may then snap the mobile computing device within the lip to secure the mobile computing device in the image capture computing device receptacle 100. As a result, the photographer may easily snap the mobile computing device into position. The lip is only an example of the receiving means. The receiving means may also be a fastening means such as a screw, bolt, nail, clip, and/or the like.

Figure 3:
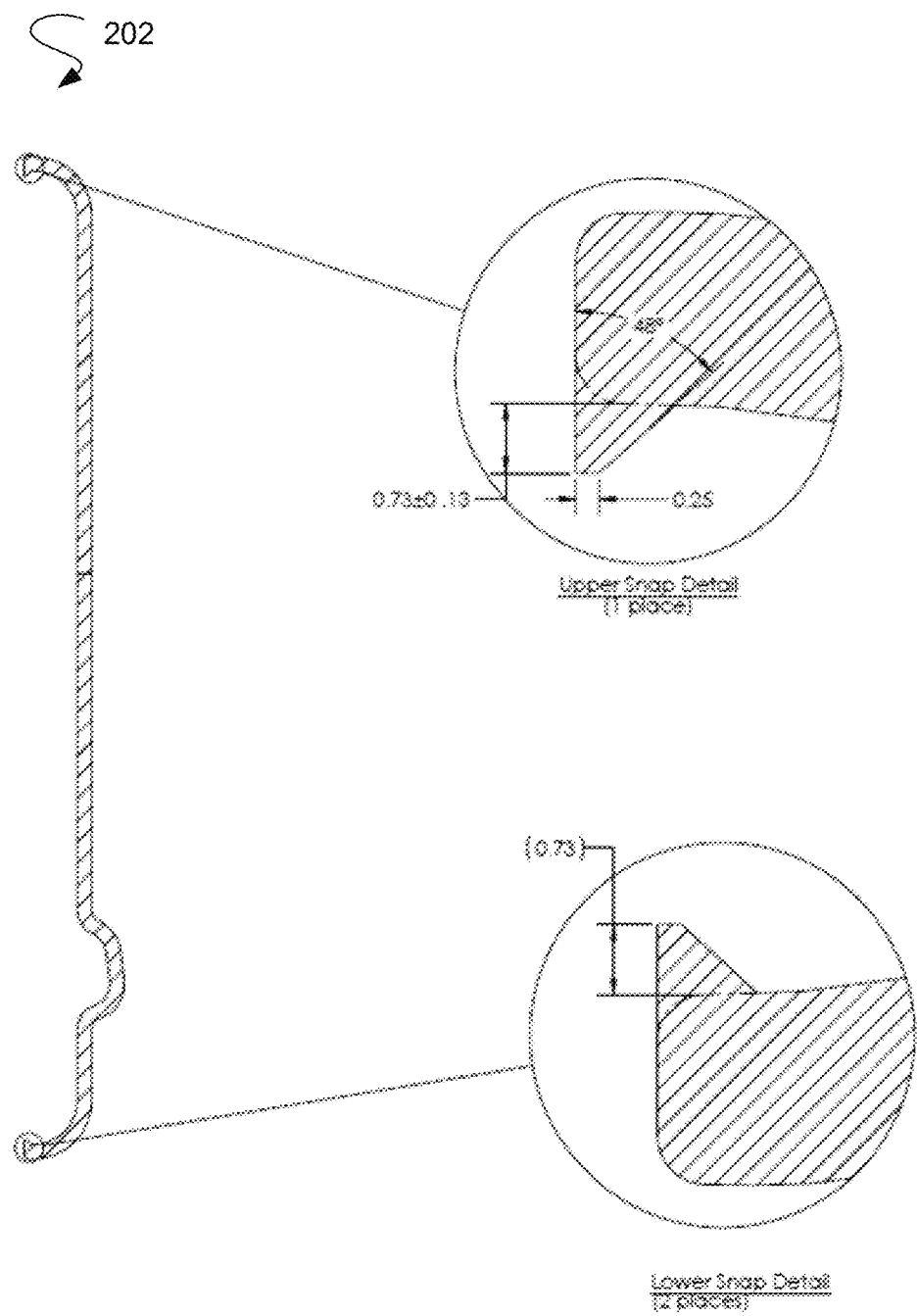
FIG. 3 illustrates a side view of the receiving means.

FIG. 3 illustrates a side view of the receiving means 202. The receiving means 202 is illustrated as a lip only for illustrative purposes as various other receiving means may be utilized.

Figure 4:
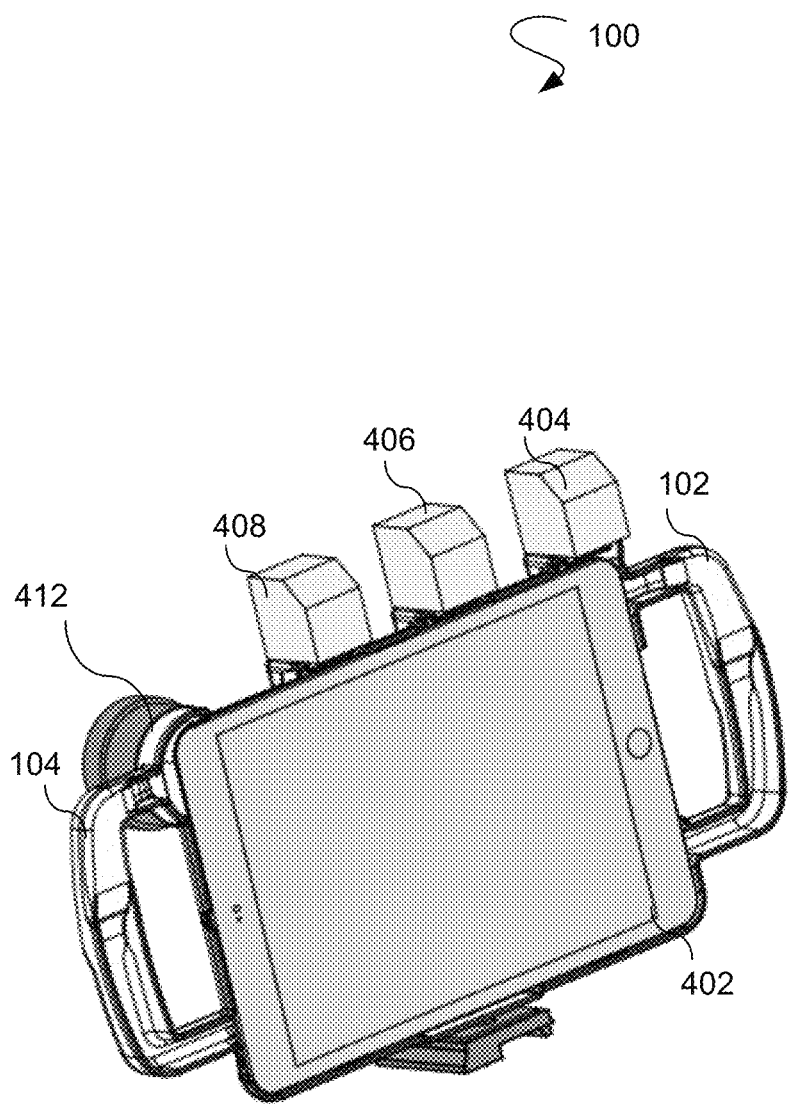
FIG. 4 illustrates a front view of the image capture computing device receptacle with a mobile computing device secured to the image capture computing device receptacle.

FIG. 4 illustrates a front view of the image capture computing device receptacle 100 with a mobile computing device 402 secured to the image capture computing device receptacle 100. The mobile computing device 402 may be a tablet device, smartphone, or any other mobile device. Further, the mobile computing device 402 may have an image capture component, e.g., a built in camera, for still or motion image capture. Various accessories 404, 406, and 408 may be connected to the receiving means 108, 110, and 112. The receiving means 108, 110, and 112 may be a lip, screw, bolt, nail, clip, and/or the like. Further, a lens accessory 412 is positioned over the aperture 106.

Although a frame single frame is illustrated in FIG. 4, multiple frames may alternatively be utilized to secure the mobile computing device 402. In other words, the image capture computing device receptacle 100 may comprise multiple parts such as a front portion and a back portion to secure the mobile computing device 402 to the image capture computing device receptacle 100. Accordingly, the image capture computing device receptacle 100 is not limited to a single frame as multiple frames may alternatively be utilized.

Figure 5:
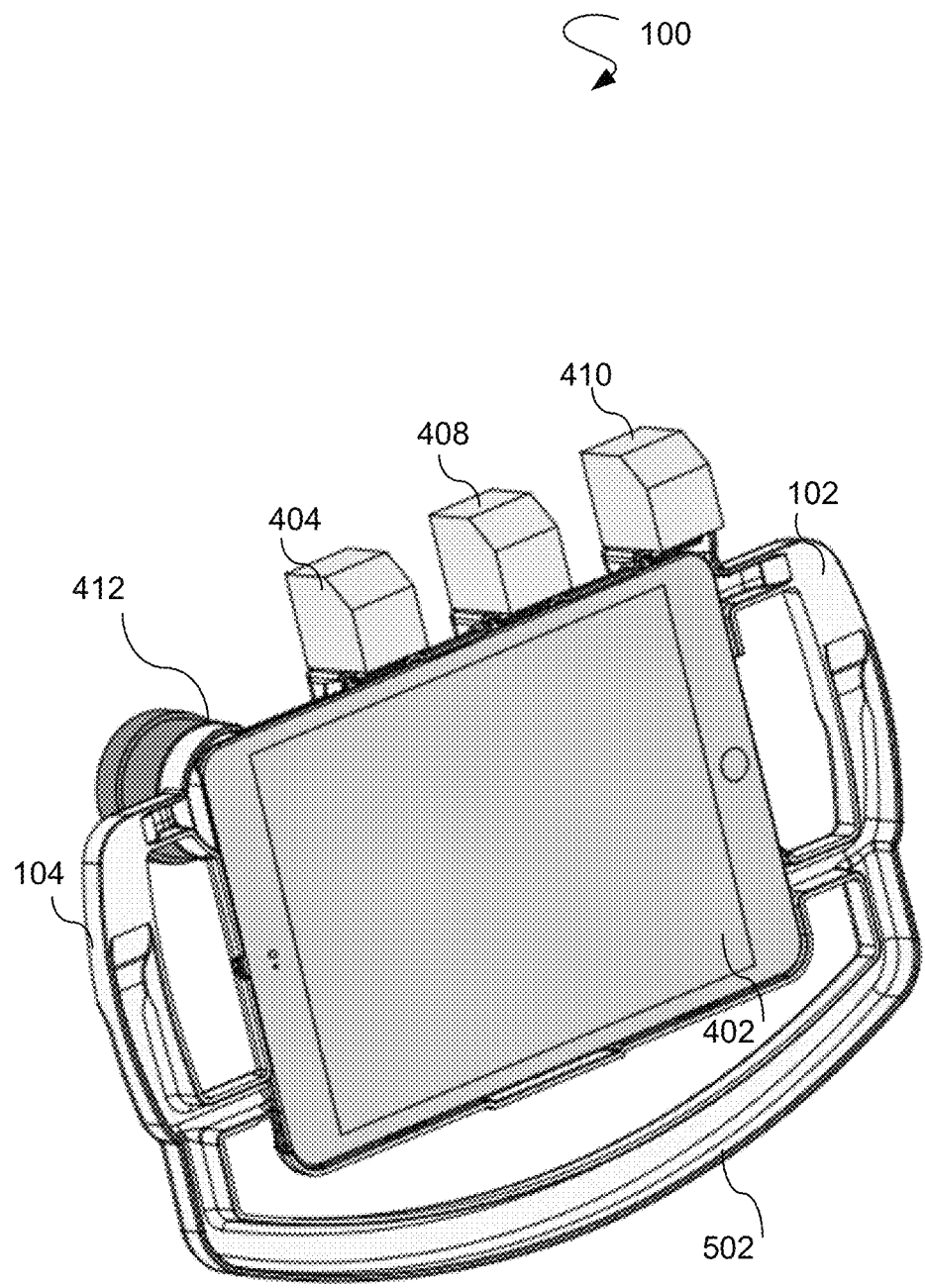
FIG. 5 illustrates a front view of the image capture computing device receptacle 100 with the mobile computing device secured to the image capture computing device receptacle and the image capture computing device receptacle having a bottom handle.

Although FIGS. 1-4 illustrated two handles, a single handle or more than two handles may be utilized. FIG. 5 illustrates a front view of the image capture computing device receptacle 100 with the mobile computing device 402 secured to the image capture computing device receptacle 100 and the image capture computing device receptacle 100 having a bottom handle 502. Alternatively, the right handle 102, the left handle 104, and the bottom handle 502 may be considered a single handle. Further, FIG. 6 illustrates a front view of the image capture computing device receptacle 100 with the mobile computing device 402 secured to the image capture computing device receptacle 100 and the image capture computing device receptacle 100 only having the left handle 104 for a handle.

Figure 6:
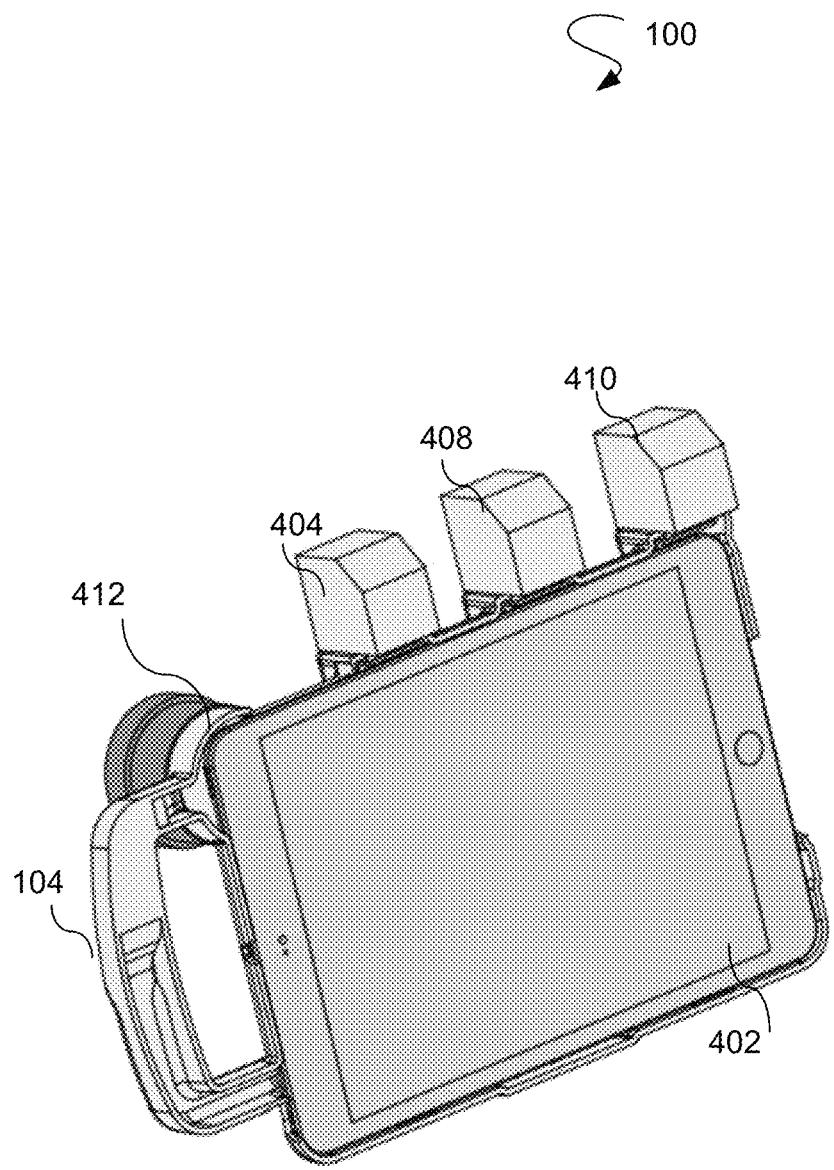
FIG. 6 illustrates a front view of the image capture computing device receptacle with the mobile computing device secured to the image capture computing device receptacle and the image capture computing device receptacle only having the right handle for a handle.
Figure 7:
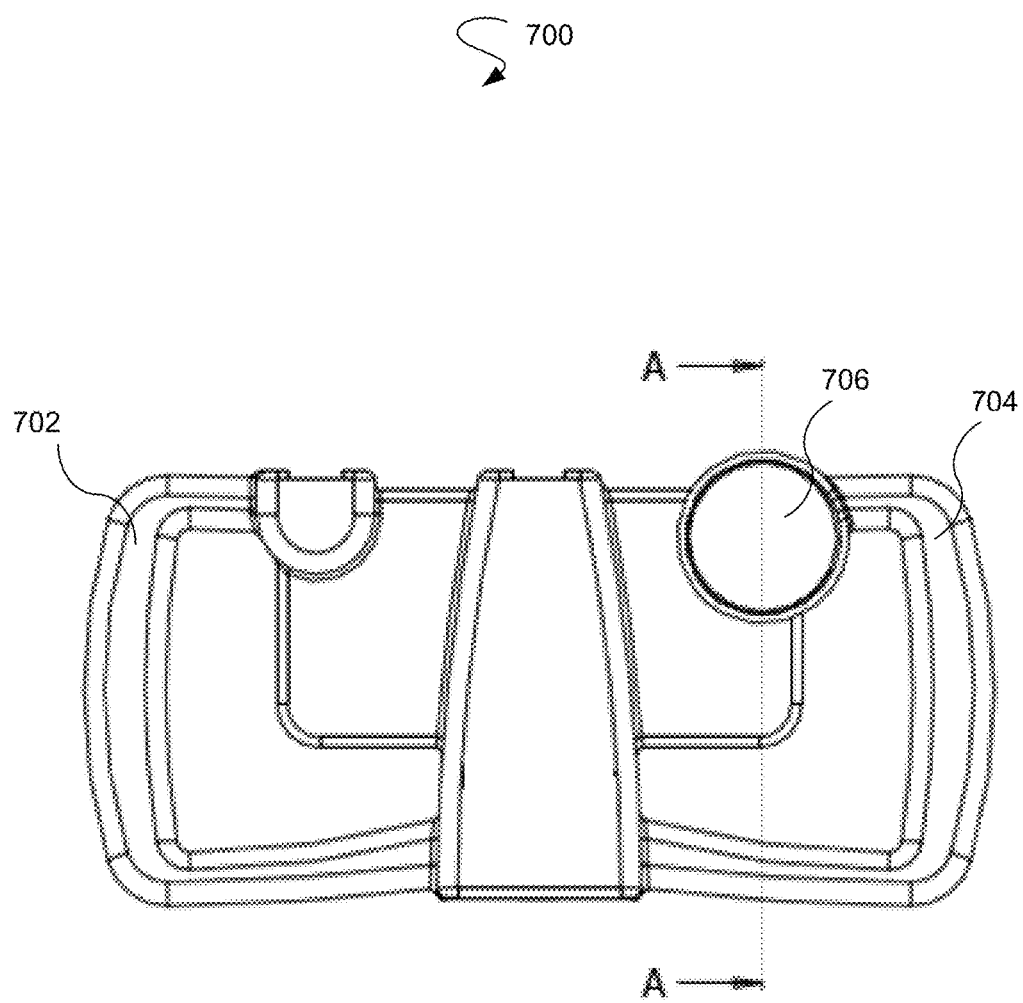
FIG. 7 illustrates a front view of an image capture computing device receptacle that is configured to receive a smartphone.
Figure 8:
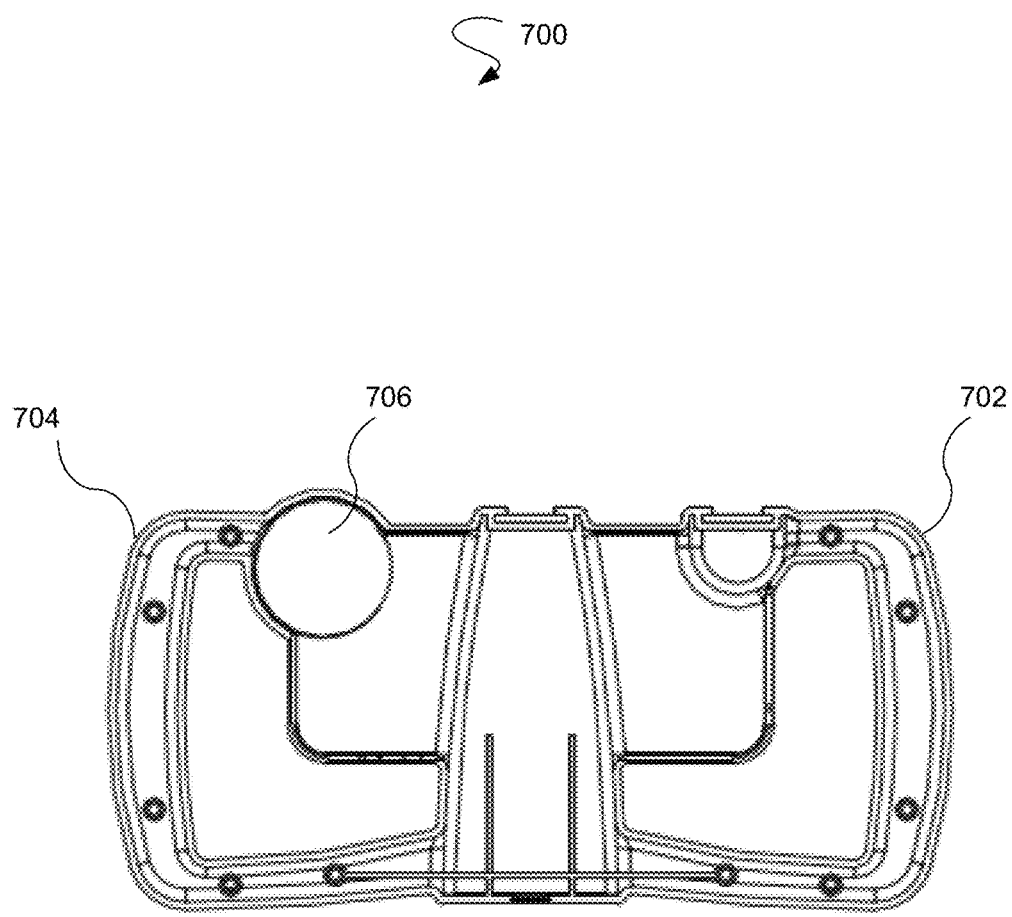
FIG. 8 illustrates a back view of the image capture computing device receptacle illustrated in FIG. 7.

Although FIGS. 4-6 illustrate the mobile computing device 402 as a tablet device, a smartphone may alternatively be utilized. Accordingly, FIG. 7 illustrates a front view of an image capture computing device receptacle 700 that is configured to receive a smartphone. The image capture computing device receptacle 700 has a right handle 702 and a left handle 704. The image capture computing device receptacle 700 also has an aperture 706. FIG. 8 illustrates a back view of the image capture computing device receptacle 700 illustrated in FIG. 7.

FIGS. 9A-9D illustrate perspective views of a retractable configuration of the image capture computing device receptacle 100 illustrated in FIG. 1. The retractable configuration of the image capture computing device receptacle 100 allows for the right handle 102 and 104 to be extended and retracted.

Figure 9A:
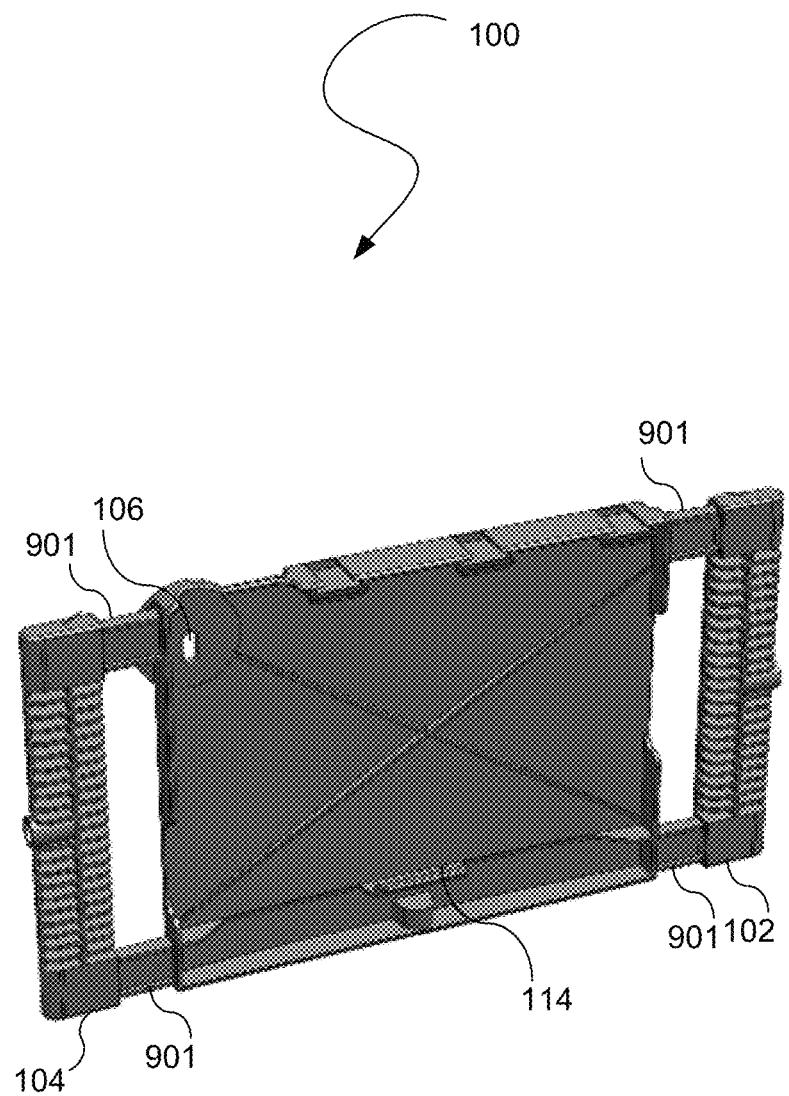
FIG. 9A illustrates a front perspective view of the retractable configuration of the image capture computing device receptacle in which the handles are extended.

FIG. 9A illustrates a front perspective view of the retractable configuration of the image capture computing device receptacle 100 in which the handles 102 and 104 are extended. In various embodiments, each of the handles 102 and 104 is attached to one or more retractable members 901 that have sliding capability to slide within the image capture computing device receptacle 100. For example, one or more trays may be situated within the image capture computing device receptacle 100 to receive the one or more retractable members 901. Various sliding mechanisms, e.g., rollers, wheels, cylinders, etc., may be utilized to slide the one or more retractable members 901 into or out of the one or more trays within the image capture computing device receptacle 100. Therefore, a user may manually pull the one or more retractable members 901 out of the image capture computing device receptacle 100.

In various other embodiments, the one or more retractable members 901 are ejected from the image capture computing device receptacle 100 via a spring configuration. In other words, one or more springs may be situated within the image capture computing device receptacle 100 near the openings from which the one or more retractable members 901 extend to eject the one or more retractable members 901 from the image capture computing device receptacle 100. As an example, a user may activate an actuator, e.g., button, knob, etc., that ejects the one or more retractable members 901 from the image capture computing device receptacle 100. As yet another example, the ejection mechanism may be the same or a different spring configuration that detects a user pushing one or both of the handles 102 and 104 inward toward the image capture computing device receptacle 100 to eject one or both of the handles 102 and 104.

In various embodiments, the retractable handles 102 and 104 illustrated in FIG. 9A may have a ribbed configuration that allows a user to have an optimal grasp for added stability during image capture. In various other embodiments, the retractable handles 102 and 104 illustrated in FIG. 9A may not have a ribbed configuration.

Figure 9B:
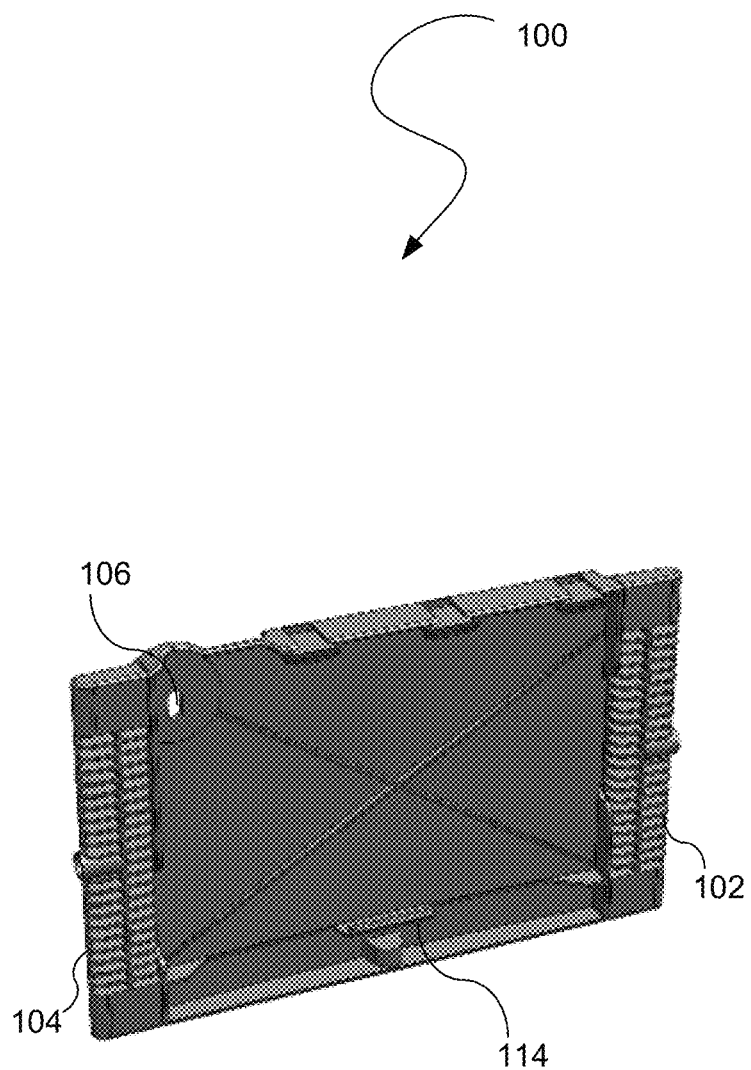
FIG. 9B illustrates a front perspective view of the retractable configuration of the image capture computing device receptacle in which the handles are retracted.

FIG. 9B illustrates a front perspective view of the retractable configuration of the image capture computing device receptacle 100 in which the handles 102 and 104 are retracted. As a result, the user may perform utilize the mobile computing device 402 of FIG. 4, which may be inserted into the computing device receptacle, without the handles 102 and 104 interfering with user inputs provided to the mobile computing device 402. For instance, a user wanting to utilize an application stored by the mobile computing device 402 would not have optimal access to a touch screen associated with the image capture computing device receptacle 100 as a user would grasp the extended handles 102 and 104 illustrated in FIG. 9A if the user wanted to grasp the sides of the mobile computing device 402 when performing such functionality. For example, the hands of the user may not be able to reach from the sides of the extended handles 102 and 104 illustrated in FIG. 9A to provide touch inputs, but could more easily reach from the sides of the retracted handles 102 and 104 illustrated in FIG. 9B.

Figure 9C:
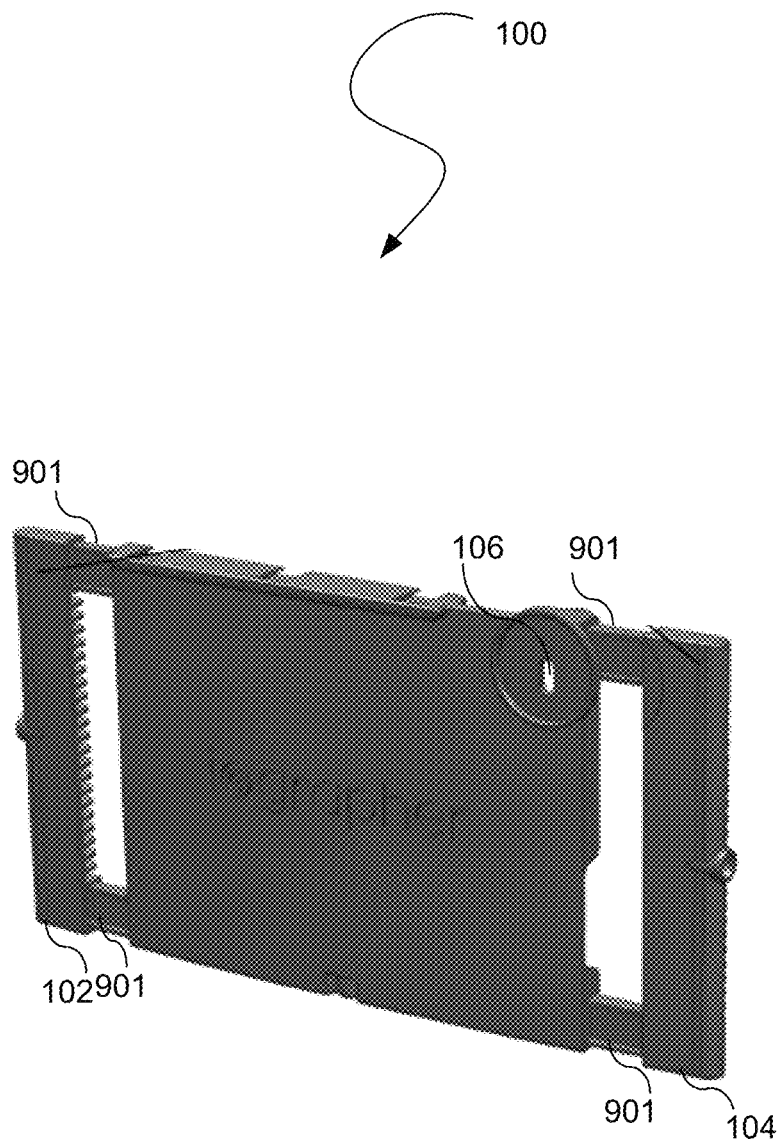
FIG. 9C illustrates a rear perspective view of the retractable configuration of the image capture computing device receptacle illustrated in FIG. 9A in which the handles are extended.
Figure 9D:
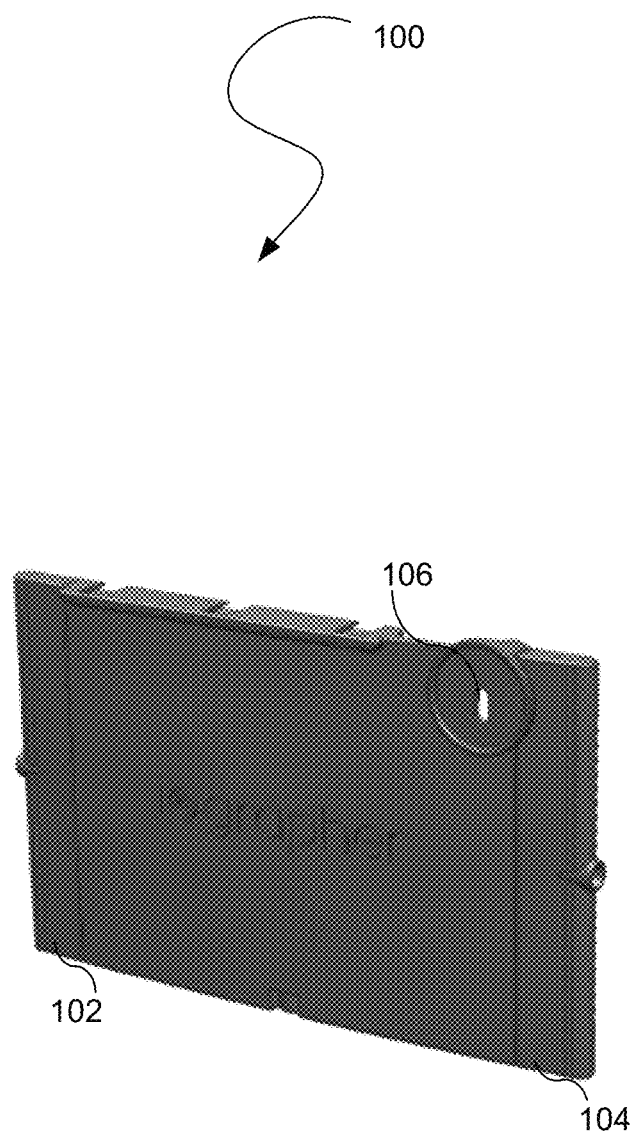
FIG. 9D illustrates a rear perspective view of the retractable configuration of the image capture computing device receptacle illustrated in FIG. 9B in which the handles are extended

FIG. 9C illustrates a rear perspective view of the retractable configuration of the image capture computing device receptacle 100 illustrated in FIG. 9A in which the handles 102 and 104 are extended. FIG. 9D illustrates a rear perspective view of the retractable configuration of the image capture computing device receptacle 100 illustrated in FIG. 9B in which the handles 102 and 104 are extended.

Figure 10A:
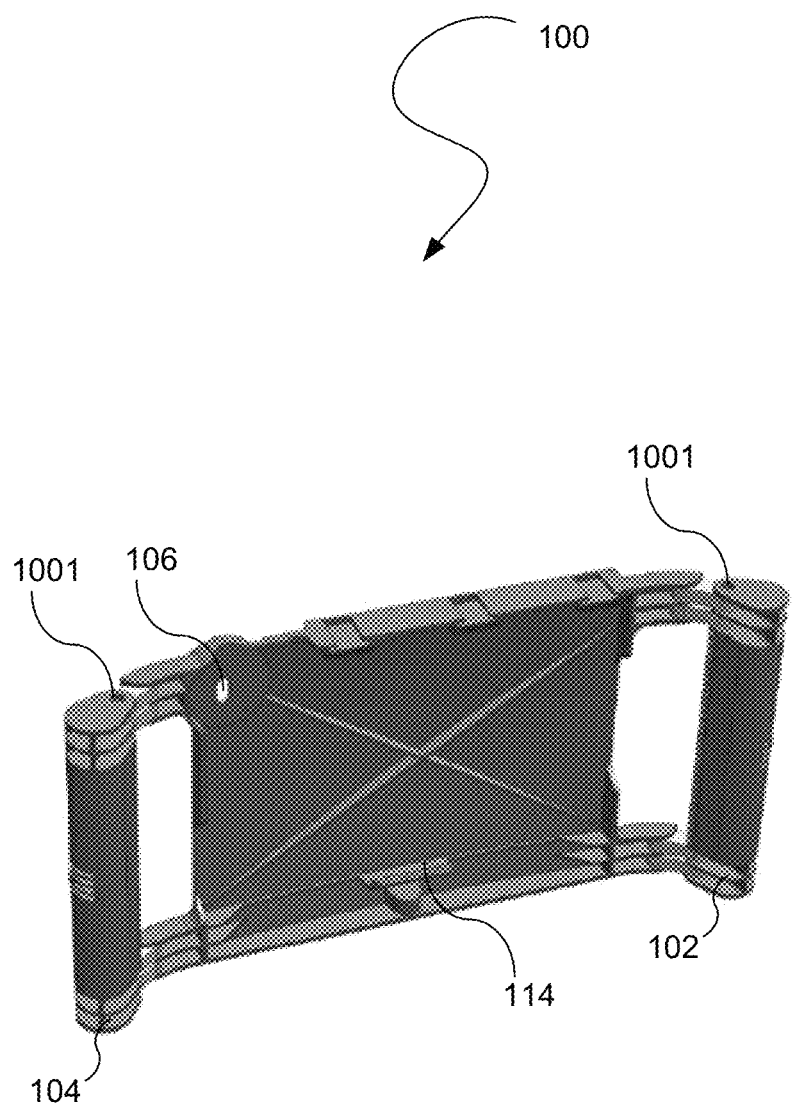
FIG. 10A illustrates a front perspective view of a compressible configuration of the image capture computing device receptacle in which the handles are extended.

FIG. 10A illustrates a front perspective view of a compressible configuration of the image capture computing device receptacle 100 in which the handles 102 and 104 are extended. The compressible configuration allows for the handles 102 and 104 to be compressed, e.g., folded, when the mobile computing device 402 illustrated in FIG. 4 situated therein is being utilized for functionality other than image capture so that the mobile computing device does not have to be removed from the image capture computing device receptacle 100.

In various embodiments, a compression mechanism 1001 may be utilized to effectuate compressing and extending the handles 102 and 104. For example, the compression mechanism 1001 may include one or more swivels, pins, springs, etc. that are utilized to allow the handles to be turned in a manner that reduces the dimensions of the exterior perimeter of the image capture computing device receptacle 100. The compression mechanism 1001 may be integrated within the handles 102 and 104 so that the handles 102 and 104 swivel on vertical axes through the handles 102 and 104. The compression mechanism 1001 may also be external to the handles 102 and 104 such that the compression mechanism 1001 is between a handle 102 or 104 and an area that receives the image capture computing device receptacle 100.

In various embodiments, the compressible handles 102 and 104 illustrated in FIG. 10A may have a ribbed configuration that allows a user to have an optimal grasp for added stability during image capture. In various other embodiments, the compressible handles 102 and 104 illustrated in FIG. 10A may not have a ribbed configuration.

Figure 10B:
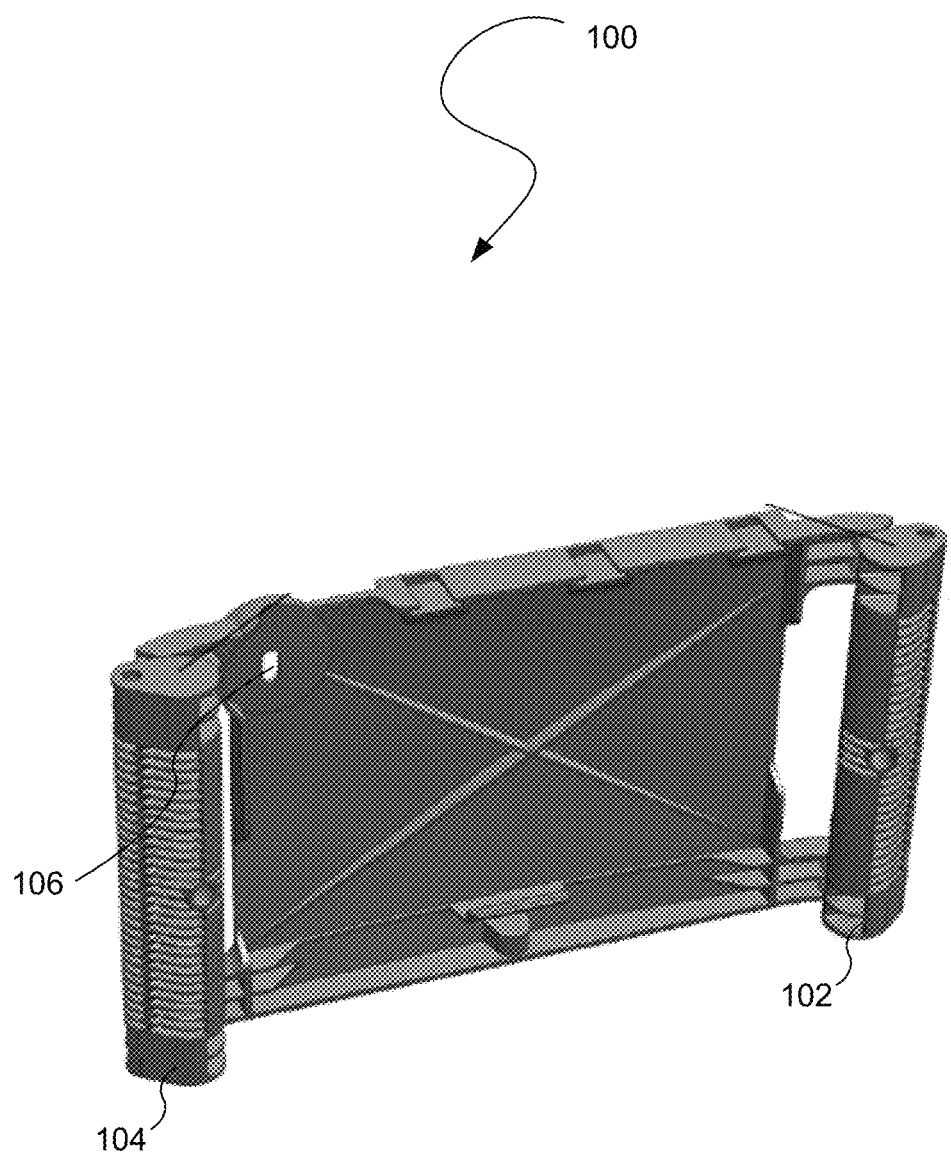
FIG. 10B illustrates a front perspective view of the compressible configuration of the image capture computing device receptacle in which the handles are compressed.
Figure 10C:
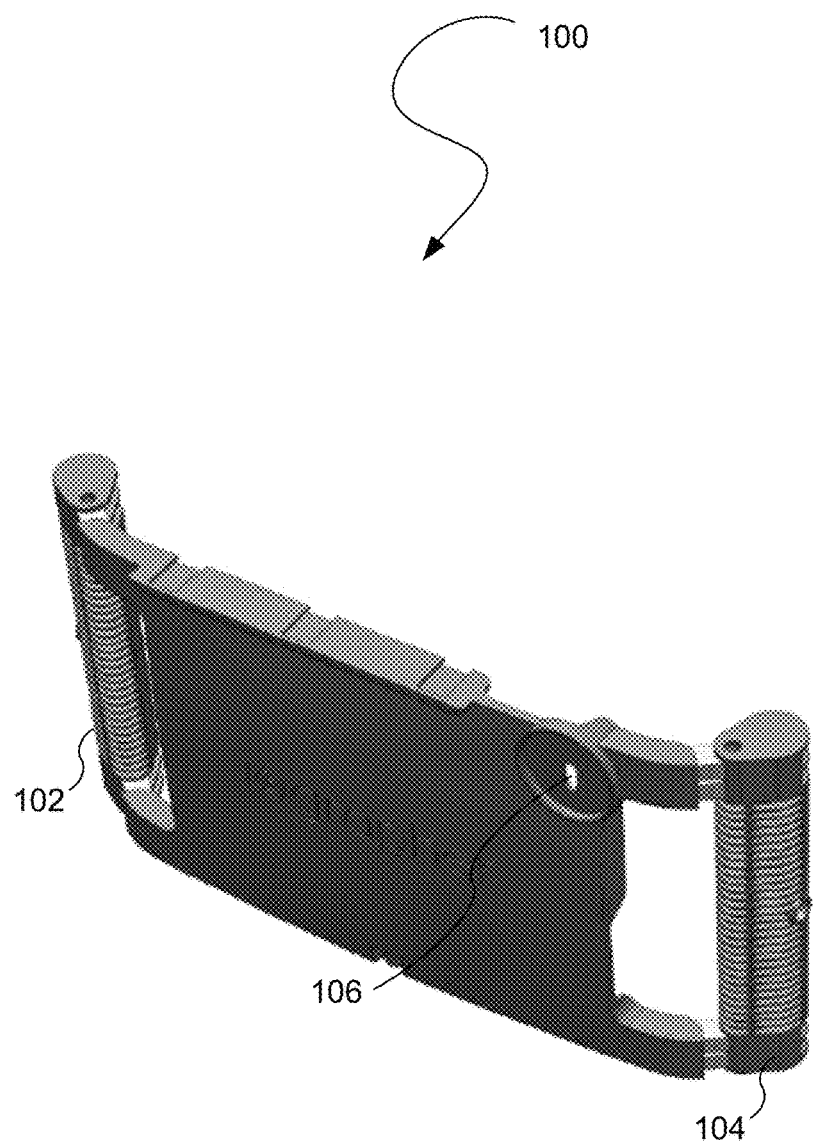
FIG. 10C illustrates a rear perspective view of the compressible configuration of the image capture computing device receptacle illustrated in FIG. 10A in which the handles are extended.
Figure 10D:
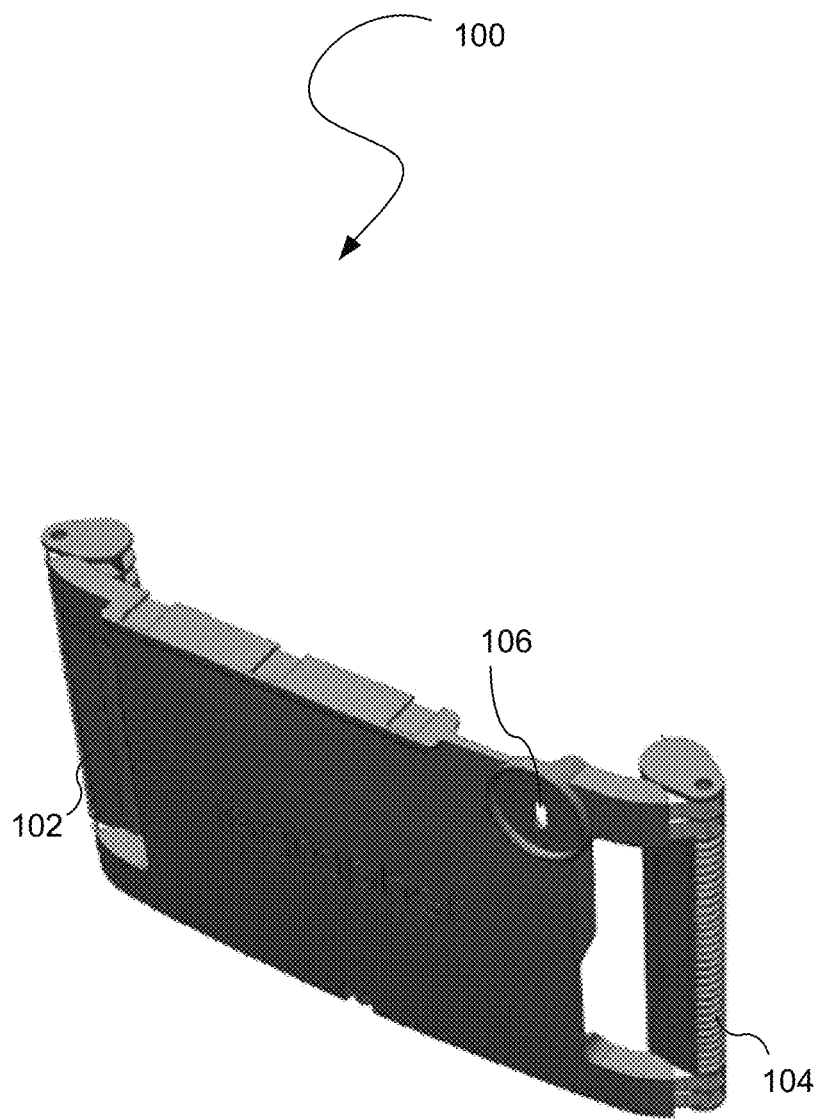
FIG. 10D illustrates a rear perspective view of the compressible configuration of the image capture computing device receptacle illustrated in FIG. 10B in which the handles are extended.

FIG. 10B illustrates a front perspective view of the compressible configuration of the image capture computing device receptacle 100 in which the handles 102 and 104 are compressed. FIG. 10C illustrates a rear perspective view of the compressible configuration of the image capture computing device receptacle 100 illustrated in FIG. 10A in which the handles 102 and 104 are extended. FIG. 10D illustrates a rear perspective view of the compressible configuration of the image capture computing device receptacle 100 illustrated in FIG. 10B in which the handles 102 and 104 are extended.

Figure 11A:
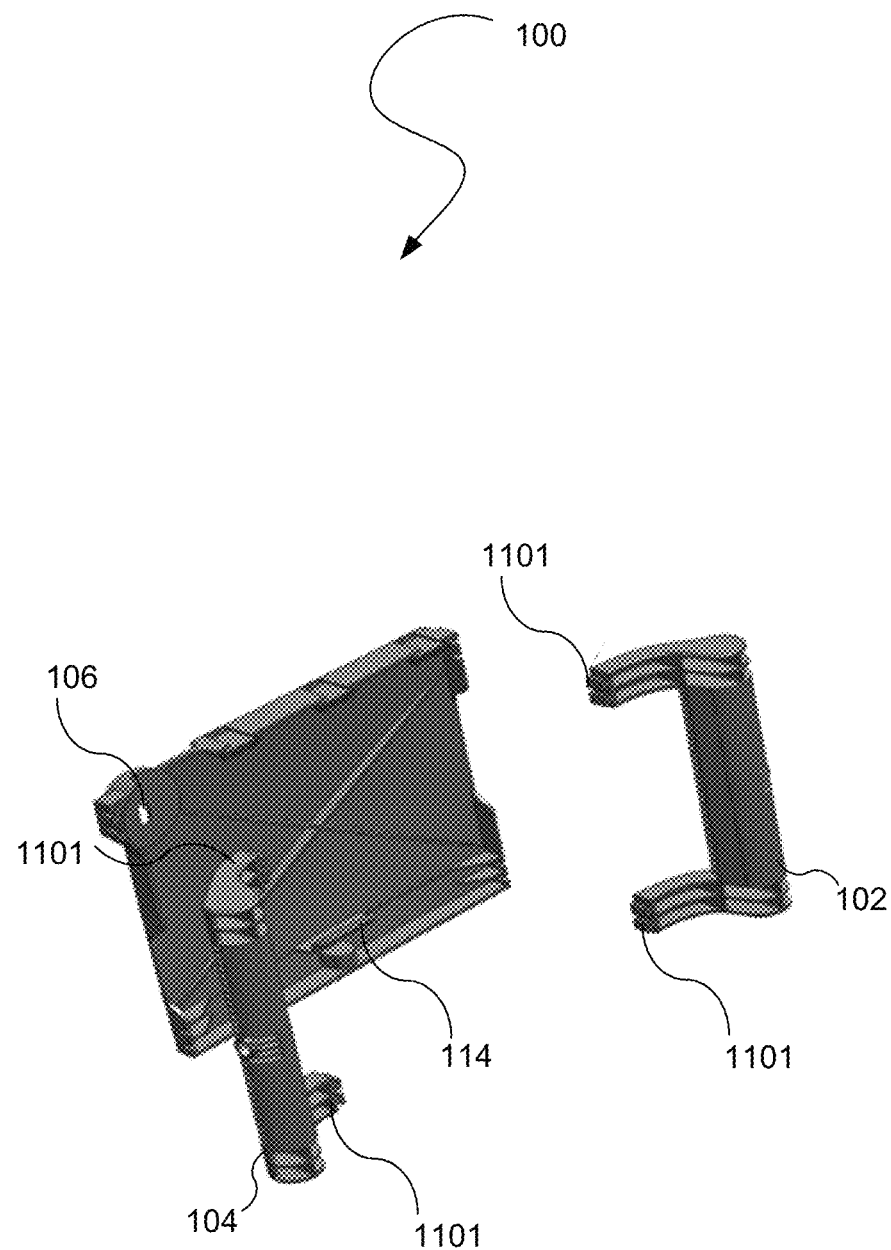
FIG. 11A illustrates a front perspective view of the detachable configuration of the image capture computing device receptacle illustrated in FIG. 1 in which the handles are detached.
Figure 11B:
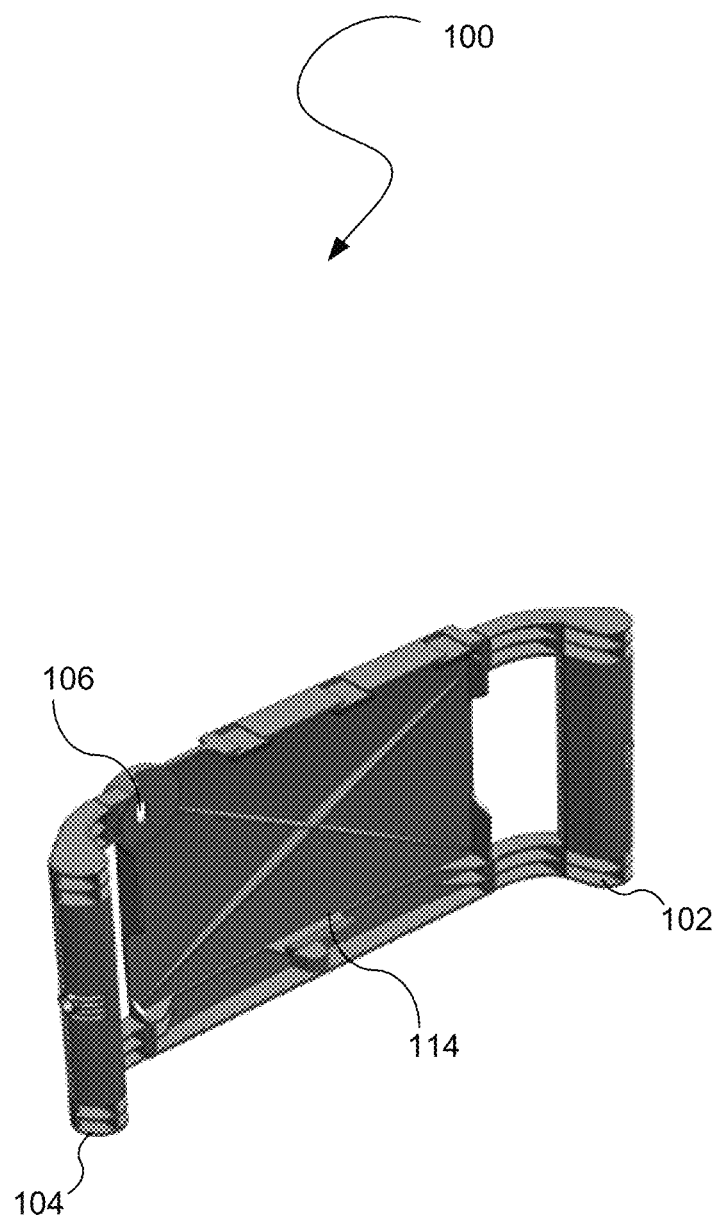
FIG. 11B illustrates a front perspective view of the detachable configuration of the image capture computing device receptacle illustrated in FIG. 1 in which the handles are attached to the image capture computing device receptacle.

FIG. 11A illustrates a front perspective view of the detachable configuration of the image capture computing device receptacle 100 illustrated in FIG. 1 in which the handles 102 and 104 are detached. A user may remove the handles 102 and 104 when the user wants to perform functionality other than image capture. In various embodiments, a clipping mechanism may be utilized to clip or remove the handles 102 and 104 to and from the retractable configuration of the image capture computing device receptacle 100. For instance, each of the handles 102 and 104 may have one or more clip members 1101 that clip into a receiver of the image capture computing device receptacle 100. FIG. 11B illustrates a front perspective view of the detachable configuration of the image capture computing device receptacle 100 illustrated in FIG. 1 in which the handles 102 and 104 are attached to the image capture computing device receptacle 100.

In various embodiments, an actuator may be utilized to detach the handles 102 and 104 from the receptacle. The user may then insert the handles 102 and 104 to clip, snap, etc., the handles 102 and 104 into the receptacle.

The configurations provided for herein allow a user to avoid the inefficiencies of the process of prior configurations of mounting, removing, and remounting a mobile computing device from a mounting configuration. The configurations provided for herein allow a user to perform image capture functionality and non-image capture functionality with the image capture computing device without removing the image capture computing device from the image capture computing device receptacle 100. As a result, a user has fewer interruptions while performing image capture and non-image capture functionality with the image capture computing device receptacle 100, which may lead to a more efficient and accurate image capture than prior configurations.

In various embodiments, the actuators for any of the configurations may be situated on the handles 102 and 104. In various other embodiments, the actuators for any of the configurations may be situated on the image capture receptacle 100.

A variety of types of materials may be utilized for the image capture computing device receptacles. For example, plastic, carbonite, metal, or the like may be utilized.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

We claim:

1. An apparatus comprising:
   a receptacle configured to receive an image capture computing device;
   a first swivel that is operably connected to the receptacle;
   a first handle having a first portion that is operably connected to the first swivel, the first handle turning inwardly toward the receptacle via the first swivel to compress the first handle without the first handle being directly positioned in front or to the rear of the receptacle, the first handle turning outwardly away from the receptacle via the first swivel to extend the first handle without the first handle being directly positioned in front or to the rear of the receptacle;
   a second swivel that is operably connected to the receptacle, the second swivel being distinct from the first swivel; and
   a second handle having a second portion that is operably connected to the second swivel, the second handle turning inwardly toward the receptacle via the second swivel to compress the first handle without the second handle being directly positioned in front or to the rear of the receptacle, the second handle turning outwardly away from the receptacle via the second swivel to extend the second handle without the second handle being directly positioned in front or to the rear of the receptacle.

2. The apparatus of claim 1, wherein the first handle is ribbed.

3. The apparatus of claim 1, wherein the second handle is ribbed.

4. The apparatus of claim 1, wherein the image capture computing device is a tablet device.

5. The apparatus of claim 1, wherein the image capture computing device is a smartphone.

6. The apparatus of claim 5, wherein the image capture computing device has an integrated image capture component.

7. The apparatus of claim 5, wherein the receptacle comprises an aperture through which the integrated image capture component is positioned to capture images.

8. The apparatus of claim 1, wherein the receptacle comprises a material selected from the following group: plastic, carbonite, and metal.

9. The apparatus of claim 1, wherein the first swivel is operably connected to a left side of the receptacle.

10. The apparatus of claim 1, wherein the second swivel is operably connected to a right side of the receptacle.

11. An apparatus comprising:
    a receptacle configured to receive an image capture computing device;
    a swivel that is operably connected to the receptacle; and
    a handle having a portion that is operably connected to the swivel, the handle turning inwardly toward the receptacle via the swivel to compress the handle without the handle being directly positioned in front or to the rear of the receptacle, the handle turning outwardly away from the receptacle via the swivel to extend the handle without the handle being directly positioned in front or to the rear of the receptacle.

12. The apparatus of claim 11, wherein the handle is ribbed.

13. The apparatus of claim 11, wherein the image capture computing device is a tablet device.

14. The apparatus of claim 11, wherein the image capture computing device is a smartphone.

15. The apparatus of claim 11, wherein the image capture computing device has an integrated image capture component.

16. The apparatus of claim 15, wherein the receptacle comprises an aperture through which the integrated image capture component is positioned to capture images.

17. The apparatus of claim 15, wherein the receptacle comprises a material selected from the following group: plastic, carbonite, and metal.

18. The apparatus of claim 11, wherein the swivel is operably connected to a left side of the receptacle.

19. The apparatus of claim 11, wherein the swivel is operably connected to a right side of the receptacle.

20. The apparatus of claim 11, further comprising a tripod component that operably connects the receptacle to a tripod.

* * * * *